(12) United States Patent
Kurokawa et al.

(10) Patent No.: US 8,297,307 B2
(45) Date of Patent: Oct. 30, 2012

(54) RELIEF VALVE STRUCTURE

(75) Inventors: Yoshitaka Kurokawa, Gunma-ken (JP);
Masahiro Kasahara, Gunma-ken (JP);
Yoshiro Umezawa, Gunma-ken (JP)

(73) Assignee: Yamada Manufacturing Co., Ltd.,
Kiryu-shi, Gunma-ken (JP)

( * ) Notice: Subject to any disclaimer, the term of this patent is extended or adjusted under 35 U.S.C. 154(b) by 462 days.

(21) Appl. No.: 12/585,936

(22) Filed: Sep. 29, 2009

(65) Prior Publication Data

US 2010/0078085 A1    Apr. 1, 2010

(30) Foreign Application Priority Data

Sep. 30, 2008   (JP) ................................ 2008-255764
Aug. 19, 2009   (JP) ................................ 2009-189977

(51) Int. Cl.
*F16K 17/04*   (2006.01)

(52) U.S. Cl. ........................................ 137/538; 417/307

(58) Field of Classification Search .................. 137/538, 137/540, 625.33; 417/307
See application file for complete search history.

(56) References Cited

U.S. PATENT DOCUMENTS

| | | | |
|---|---|---|---|
| 2,005,813 A * | 6/1935 | Thorsen | 137/494 |
| 3,392,715 A * | 7/1968 | Thoma | 123/457 |
| 7,677,263 B2 * | 3/2010 | Hoji et al. | 137/115.26 |

FOREIGN PATENT DOCUMENTS

| | | |
|---|---|---|
| JP | 5-195742 | 8/1993 |
| JP | 2543058 | 4/1997 |
| JP | 2005-069352 A | 3/2005 |

OTHER PUBLICATIONS

Japanese Office Action dated Mar. 13, 2012, with partial English translation.

* cited by examiner

*Primary Examiner* — Kevin Lee
*Assistant Examiner* — Macade Brown
(74) *Attorney, Agent, or Firm* — McGinn IP Law Group, PLLC (57) ABSTRACT

To provide a relief valve structure for an oil pump, which is capable of appropriately controlling/switching the discharge pressure and flow rate of oil to an optimum condition in low, middle and high speed regions of an engine. The relief valve structure has: a relief valve having formed therein a valve flow path for communicating between a valve head part and an outer circumferential side part; a valve housing in which a valve passage accommodating the relief valve is formed; a relief flow-in part formed on an axial direction one end side of the valve passage and communicating with the valve passage; a first discharge part formed in the valve housing and communicating with the valve flow path by the movement of the relief valve; and a second discharge part that is opened by allowing the valve head part to pass therethrough. The second discharge part is positioned nearer to the relief flow-in part than the first discharge part. The shortest gap between an outer circumferential side part opening of the valve flow path and the first discharge part is the same as or shorter than the shortest gap between the valve head part and the second discharge part during an initial state of the relief valve.

3 Claims, 9 Drawing Sheets

INITIAL STATE

Fig.5B

LOW SPEED REGION

Fig.5C

LOW SPEED TO MIDDLE SPEED

Fig.6A
MIDDLE SPEED REGION

Fig.6B
MIDDLE SPEED TO HIGH SPEED

Fig.6C
HIGH SPEED REGION

RELIEF VALVE STRUCTURE

BACKGROUND OF THE INVENTION

1. Field of the Invention

The present invention relates to a relief valve structure for an oil pump of an engine of a vehicle, the relief valve being capable of appropriately controlling/switching the discharge pressure and flow rate of oil to an optimum condition in low, middle and high speed regions of the engine.

2. Description of the Related Art

Lubricant oil is supplied to an engine of a vehicle through an oil pump by carrying out engine operation. Most oil pumps are installed with a relief valve for controlling the pressure of the oil. The relief valve device evens out the pressure of the oil by releasing the oil to a different route when the pressure of the oil rises in the oil pump, in order to prevent harmful effects to other devices.

However, relief operation of the relief valve drops the pressure of the oil from high to low without stopping, and therefore the amount of oil supply pulsates without being constant, generating bubbles in the oil. As a result, the relief valve devices tarts vibrating, causing possible harmful effects to the other devices to be supplied with the oil. Therefore, some relief valve devices are designed to return the oil from the relief valve a little bit at a time in the initial stage, in order to prevent rapid drop of the pressure.

Furthermore, recent oil pumps are required to perform more meticulous control. For example, the discharge pressure and flow rate of oil are reduced to realize high efficiency in a certain rotation speed region, but a volume of discharge pressure and flow rate of oil are ensured in order to secure lubrication in another rotation speed region. The requirement of such characteristics is attributed to the following fact. In other words, in the cold months of the year, the engine oil cools down when the engine is not activated.

As a result, the viscosity of the oil increases, and consequently the discharge pressure of the oil pump increases when the engine is started in this state. Then, the discharge pressure of the oil pump reaches the highest level when the engine is rotated to the maximum speed with the cold engine oil. Overly high discharge pressure in such circumstances causes a strain on the oil filter and pipe system, and the amount of unnecessary work increases, causing harmful effects to the abovementioned other devices.

However, in a rotation speed region where the discharge pressure exceeds a predetermined value once and the relief valve is already opened, a conventional relief structure generally cannot control the discharge pressure by further opening the valve. Note that an air vent hole is formed on the deeper side of the relief valve so that the relief valve can smoothly move in the axial direction. The capacity on the deeper side of the relief valve changes significantly as the relief valve moves in the axial direction.

By allowing the air to be drawn/discharged to/from the air vent hole, the relief valve can smoothly move in the axial direction. In other words, the space on the deeper side of the relief valve is in the form of a so-called closed chamber, which is configured such that the volume of the space on the deeper side of the relief valve cannot fluctuate without a hole through which air can pass to the outside. Because the outside of the air vent hole is in the form of an oil pan, there is little difference whether the substance to be drawn/discharge is air or oil.

The prior art documents, Japanese Utility Model Registration No. 2543058 and Japanese Patent Application Publication No. H5-195742, disclose how the discharge pressure is controlled in the relief valve single mechanism (achieving high efficiency by reducing the amount of unnecessary work, as well as a balance between lubricity and reliability by ensuring discharge pressure). Generally, when performing a control for increasing and reducing the discharge pressure in multiple stages, in most cases a plurality of opening parts are provided on a side surface of a valve passage. The relief valves moves in the axial direction as the discharge pressure increases or decreases, whereby the number openings on the side surface of the valve passage increases or decreases, and the area of opening increases to relieve the oil. Consequently, the amount of oil relieved and the discharge pressure can be increased or decreased.

As already described, in an oil pump the discharge pressure and the discharge flow rate are substantially proportional to the rotation speed of the pump. However, from the perspective of the engine system, broadly speaking the required oil pressure and the required oil flow rate are apt to increase logarithmically in relation to the rotation speed (the more the rotation speed increases, the more the increasing rate of the required oil is reduced). In other words, when comparing the discharge pressure of the pump with the pressure required by the engine system on the basis of the rotation speed, the higher the rotation speed is, the greater the deviation of the pump supply pressure and the pressure required by the engine system.

From the phenomenon described above, clearly, it is preferred to carry out a control for gradually increasing the area of opening for relieving the oil (the amount and pressure of oil to be relieved) as the rotation speed increases. In the actual operation, as the discharge pressure rises, the spring shrinks gradually, whereby the relief valve recedes. As a result, the number of through-holes for opening the relief opening parts provided on the side surface of the valve passage increases. Unnecessary amount of work can be reduced by performing the control for further increasing the oil pressure to be relieved (but the discharge pressure is not increased significantly) when the rotation speed increases as described above.

In so doing, the area of opening of each relief opening parts provided on the side surface of the valve passage needs to be larger on the deeper side of the valve. When the area of opening of the relief opening parts is larger on the deeper side of the valve, the oil pressure to be relieved can be further increased as the rotation speed increases. In other words, for example, when the relief opening parts having a larger opening area are arranged on the near side of the valve passage to prevent the increase of the discharge pressure, the oil is relieved first from the relief opening parts with a larger opening area in a middle speed region where the oil does not need to be relieved. Consequently, a large amount of oil is relieved and the discharge pressure is reduced, whereby the lubricity becomes inadequate.

When the oil pump requires a certain level of oil pressure to ensure lubricity and reliability in a certain rotation speed region only, the relief valve that is opened in the middle speed region once needs to be closed again in certain middle to high speed regions higher than the middle speed region, to ensure the oil pressure. In the middle to high speed regions higher than the middle speed region, the relief valve is receded to the further deeper side by high discharge pressure. Therefore, the first relief path 3 of Japanese Utility Model Registration No. 2543058 and the first relief hole 3a of Japanese Patent Application Publication No. H5-195742 that are in "front" of the relief valve opening in the middle speed region cannot be left closed.

Thus, in the piston-shaped valve body 7 of Japanese Utility Model Registration No. 2543058 and the sleeve 7 of Japanese Patent Application Publication No. H5-195742 are disposed to close the first relief path 3 and first relief hole 3a in front of the relief valve at the middle to high speed regions. In other words, the piston-shaped valve body 7 and the sleeve 7 are required in Japanese Utility Model Registration No. 2543058 and Japanese Patent Application Publication No. H5-195742 respectively, as the special members for closing, again, the first relief path 3 of Japanese Utility Model Registration No. 2543058 and the first relief hole 3a of Japanese Patent Application Publication No. H5-195742 that are opened once, in the region of higher rotation speed.

Furthermore, the relief valve is provided with a hole for closing the opened relief opening parts in the middle to high speed regions. For example, this hole is the first valve hole 7B in Japanese Utility Model Registration No. 2543058 and the sleep hole 7a in Japanese Patent Application Publication No. H5-195742. The discharge pressure is controlled by opening and closing these holes with respect to the relief opening parts. In the low speed region where idling is also performed, because the rotation speed is low and therefore the discharge pressure, the oil is not relieved from the relief valve, and all of the relief opening parts are closed.

Thereafter, the relief valve recedes to the deeper side and opens or closes as the discharge pressure increases, the hole provided in the relief valve is located in a position further ahead of the relief opening part that is in the very front part of the low speed region in both Japanese Utility Model Registration No. 2543058 and Japanese Patent Application Publication No. H5-195742. This configuration causes the following problems. Generally, the oil is relieved from the relief opening parts, but when the through-hole provided in the relief valve is positioned in front of the relief opening parts in the axial direction, the oil oozing out of the through-hole of the relief valve cannot reach a sliding surface between the relief valve and the valve passage. As a result, the oil is discharged from the relief opening parts, deteriorating the slidability of the relief valve.

The oil oozing out of the hole provided in the relief valve is discharged from the relief opening parts to the further deeper side and therefore cannot reach the back (deeper side) of the relief valve. Because the oil cannot readily reach the deeper side of the relief valve, the oil pressure on the deeper side of the relief valve decreases. Consequently, the spring located on the deeper side of the relief valve shrinks to a set value or more and slants over a long period of time, reducing its durability.

SUMMARY OF THE INVENTION

Moreover, another special member is required in order to close the relief opening parts again in the middle to high speed regions. An object (technical problem) of the present invention is to appropriately, accurately and reliably control/switch, in an oil pump of an engine of a vehicle, the discharge pressure and flow rate of oil to an optimum condition in low, middle and high speed regions of the engine.

In order to solve the problem described above, as a result of the keen studies, the inventors have arrived at the following invention of claim 1 to solve the problem, the invention being a relief valve structure, having: a relief valve having formed therein a valve flow path for communicating between a valve head part and an outer circumferential side part; a valve housing in which a valve passage accommodating the relief valve is formed; a relief flow-in part formed on an axial direction one end side of the valve passage and communicating with the valve passage; a first discharge part formed in the valve housing and communicating with the valve flow path by the movement of the relief valve; and a second discharge part that is opened by allowing the valve head part to pass therethrough, wherein the second discharge part is positioned nearer to the relief flow-in part than the first discharge part, and the shortest gap between an outer circumferential side part opening of the valve flow path and the first discharge part is the same as or shorter than the shortest gap between the valve head part and the second discharge part during an initial state of the relief valve.

The inventors have arrived at the following invention of claim 2 to solve the problem, the invention being the relief valve structure in claim 1, wherein the longest gap between the first discharge part and the second discharge part is the same as or shorter than a gap between a boundary position between an inclined surface part of the relief valve and the outer circumferential side part, and a section closest to the valve head part of the outer circumferential side part opening. The inventors have arrived at the following invention of claim 3 to solve the problem, the invention being the relief valve structure in claim 1 or 2, wherein the outer circumferential side part opening of the valve flow path is formed as an outer circumferential groove formed along a circumferential direction of the outer circumferential side part.

The inventors have arrived at the following invention of claim 4 to solve the problem, the invention being a relief valve structure, having: a relief valve having formed therein a valve flow path for communicating between a valve head part and an outer circumferential side part; a valve housing in which a valve passage accommodating the relief valve is formed; a relief flow-in part formed on an axial direction one end side of the valve passage and communicating with the valve passage; a first discharge part formed in the valve housing and communicating with the valve flow path by the movement of the relief valve; and a second discharge part that is opened by allowing the valve head part to pass therethrough, wherein, at the time of relief operation, the valve flow path and the first discharge part are communicated with each other prior to the start of an operation for allowing the valve head part to pass through the second discharge part, the communication only is established during middle-speed rotation of an engine, the operation for allowing the valve head part to pass through the second discharge part is started during high-speed rotation of the engine, and a transition region where the rotation speed of the engine transits from the middle speed to the high speed has a rotation speed region where relief does not take place.

In the invention of claim 1, the second discharge part is positioned nearer to the relief flow-in part than the first discharge part, so the first discharge part is positioned on the deeper side in a sliding direction where oil pressure of the relief valve acts. The oil oozing out of the valve flow path into the outer circumferential side part opening functions as a lubricant to allow the relief valve to perform sliding operation in the valve passage more smoothly, improving the durability/reliability of the relief valve.

Moreover, the valve flow path is formed in the relief valve, and the oil flows from the valve head part is continuously supplied into the valve flow path a little bit at a time. Consequently, the deeper side of the relief valve constantly has the oil that serves as a damper to inhibit a spring from shrinking and slanting, whereby the durability of the spring improves.

According to the configuration of the relief valve of the present invention, in the low speed region of the engine, the first discharge part and the second discharge part can be closed, and therefore the oil is not relieved. In the middle speed region of the engine, only the first discharge part and the outer circumferential side part opening of the relief valve can be communicated, and the oil is relieved only from the first discharge part. Furthermore, in the high speed region of the engine, the relief valve slides inside the valve passage and the valve head part passes through the second discharge part, whereby the oil is relieved from the second discharge part. In this manner, relief of the oil can be controlled to an appropriate condition in accordance with the viscosity depending on the humidity of the oil and the engine rotation speed, and appropriate discharge pressure and flow rate of the oil can be obtained in accordance with the engine rotation speed.

According to the invention of claim 2, especially in the transition region between the middle speed region and the high speed region, both the first discharge part and the second discharge part are closed, and therefore the oil is not relieved. Also, the discharge pressure and flow rate can be increased in the transition region. According to the invention of claim 3, the outer circumferential side part opening of the valve flow path is the outer circumferential groove part formed along the circumferential direction of the outer circumferential side part. Hence, a more secure communication can be realized between the valve flow path of the relief valve and the first discharge part, regardless of the mounting angle of the relief valve.

According to the invention of claim 4, at the time of relief operation, the valve flow path and the first discharge part are communicated with each other prior to the start of an operation for allowing the valve head part to pass through the second discharge part, the communication only is established during middle-speed rotation of an engine, the operation for allowing the valve head part to pass through the second discharge part is started during high-speed rotation of the engine, and relief does not take place in a transition region where the rotation speed of the engine transits from the middle speed to the high speed. Therefore, the most appropriate discharge amount and pressure of the oil can be obtained especially in a region of the transition region where the rotation speed of the engine transits from the middle speed to the high speed, the region requiring a discharge amount and pressure of the oil.

DESCRIPTION OF THE PREFERRED EMBODIMENTS

Figure 1A:
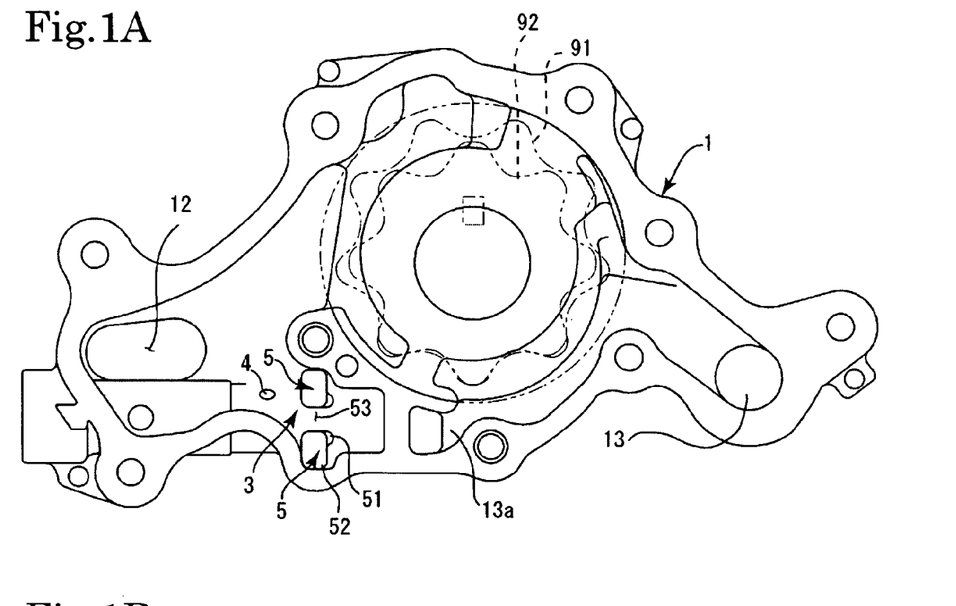
FIG. 1A is a plan view of a pump body having a relief structure of the present invention.

Hereinafter, embodiments of the present invention will be described with reference to the drawings. A pump body 1 is configured along with a pump cover that is not shown. A rotor chamber 11 is formed inside the pump body 1. Specifically, a concave part is formed in the pump body 1, and the concave part is configured as the flat cylindrical hollow rotor chamber 11 when the pump cover is fixed to the pump body 1. In the rotor chamber 11, an outer rotor 91 provided with internal teeth and an inner rotor 92 provided with external teeth are meshed with each other and mounted in a decentered manner. The outer rotor 91 and the inner rotor 92 are shown by imaginary lines (two-dot chain lines) in FIG. 1.

Specifically, in the outer rotor 91 and the inner rotor 92, the teeth of the inner rotor 92 are formed along a trochoidal curve. The number of teeth of the inner rotor 92 is less than the number of teeth of the outer rotor 91 by one. When the inner rotor 92 rotates once, the outer rotor 91 rotates with a delay of one tooth. At any angle of rotation, the tooth tips of the inner rotor 92 are constantly in contact with the tooth tips or tooth bases of the outer rotor 91. A plurality of space parts are formed between the outer rotor 91 and adjacent tooth tips of the inner rotor 92, and each of the space part draws oil from an intake port 12 and discharges the oil to a discharge port 13 to circulate the oil throughout the devices, by expanding or shrinking in one rotation.

Figure 1B:
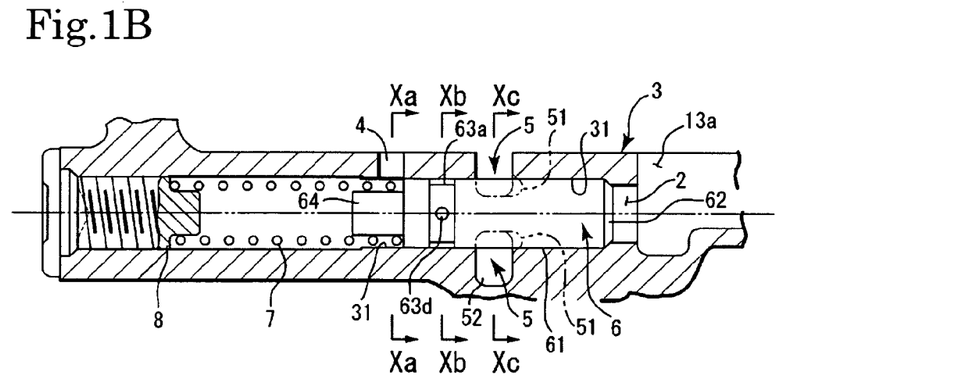
FIG. 1B is an enlarged lateral sectional plan view of the relief structure.
Figure 1C:
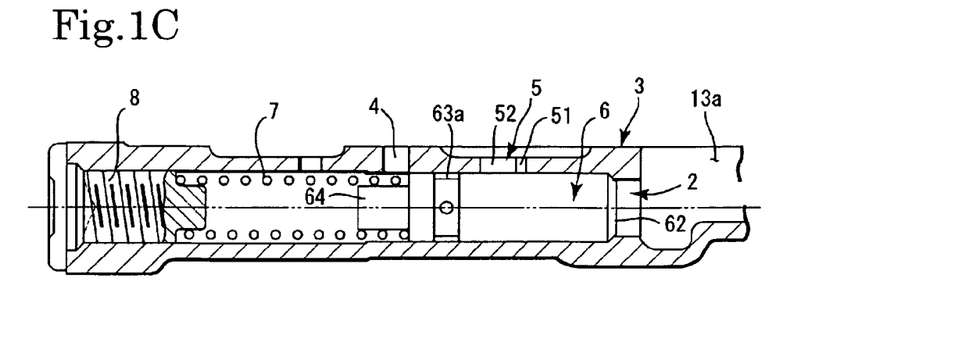
FIG. 1C is an enlarged longitudinal sectional side view of the relief structure.
Figure 2A:
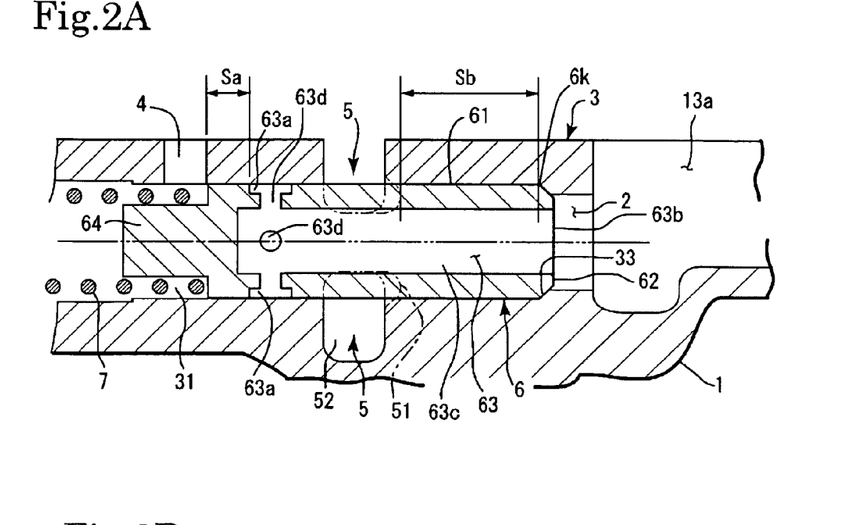
FIG. 2A is an enlarged lateral sectional plan view showing a substantial part of the relief structure.
Figure 2B:
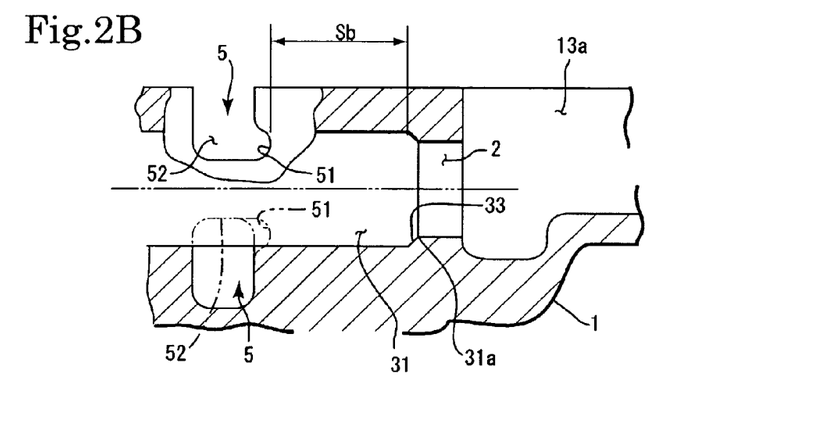
FIG. 2B is an enlarged plan view showing a substantial part of a partial cross section of a valve housing.
Figure 2C:
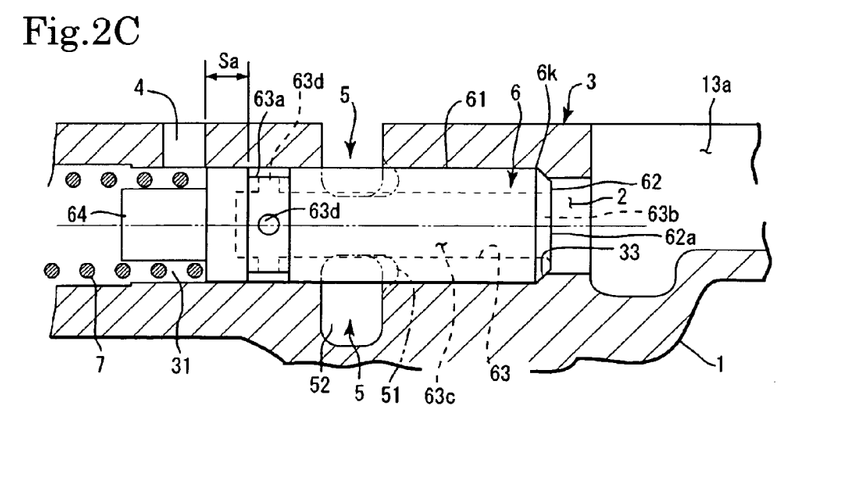
FIG. 2C is an enlarged lateral sectional plan view showing a substantial part of the valve housing.

Next, a relief valve device is configured by a valve housing 3 and a relief valve 6, as shown in FIGS. 1B, 1C and FIG. 2. A valve passage 31 in which the relief valve 6 slides is formed in the valve housing 3, and the relief valve 6 slides inside the valve passage 31. The valve housing 3 and a relief flow-in part 2 are formed integrally, and the relief flow-in part 2 and the valve passage 31 are communicated with each other. Specifically, an axial direction one end of the valve passage 31 is communicated with the relief flow-in part 2. The valve housing 3 is formed into a substantially cylindrical shape in a predetermined position inside the pump body 1, in a bulging manner (see FIG. 3).

A branch path 13a is formed in the discharge part 13, and the branch path 13a and the relief flow-in part 2 are communicated with each other (see FIGS. 1 and 2). When the pressure of discharge oil within the discharge port 13 increases, fluid is fed from the branch path 13a to the valve passage 31 via the relief flow-in part 2 to press and move the relief valve 6 along an axial direction, whereby a relief operation is carried out.

The inner diameter of the relief flow-in part 2 and the inner diameter of the valve passage 31 are different. A step is formed between the valve passage 31 and the relief flow-in part 2 due to the difference between the diameters, and this step section functions as a relief flow-in closing surface 33 for a section on the valve passage 31 side where the relief valve 6 and the relief flow-in part 2 are communicated with each other (see FIGS. 2A and 2B). The position of the relief flow-in closing surface 33, that is, the boundary line between the relief flow-in part 2 and the valve passage 31, is called "start end part 31a of the valve passage 31," which is the reference position of the valve passage 31. An initial state of the relief valve 6 is a state in which the head part of the relief valve 6 abuts on the relief flow-in closing surface 33 (see FIGS. 1B, 1C, and FIG. 2A).

Figure 4A:
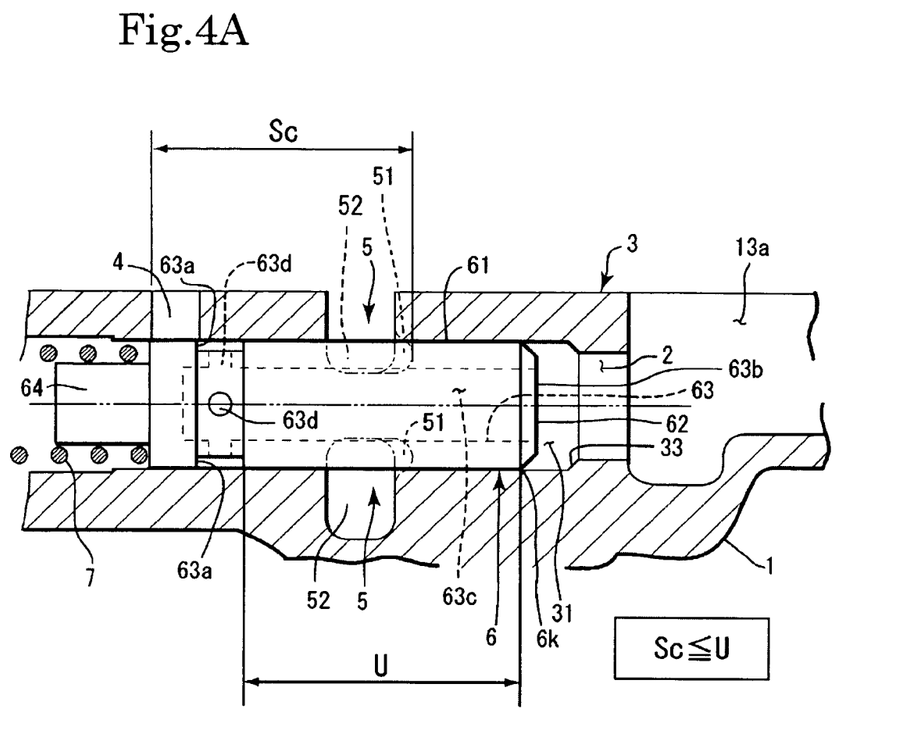
FIG. 4A is a lateral sectional plan view showing a substantial part of the valve housing.
Figure 4B:
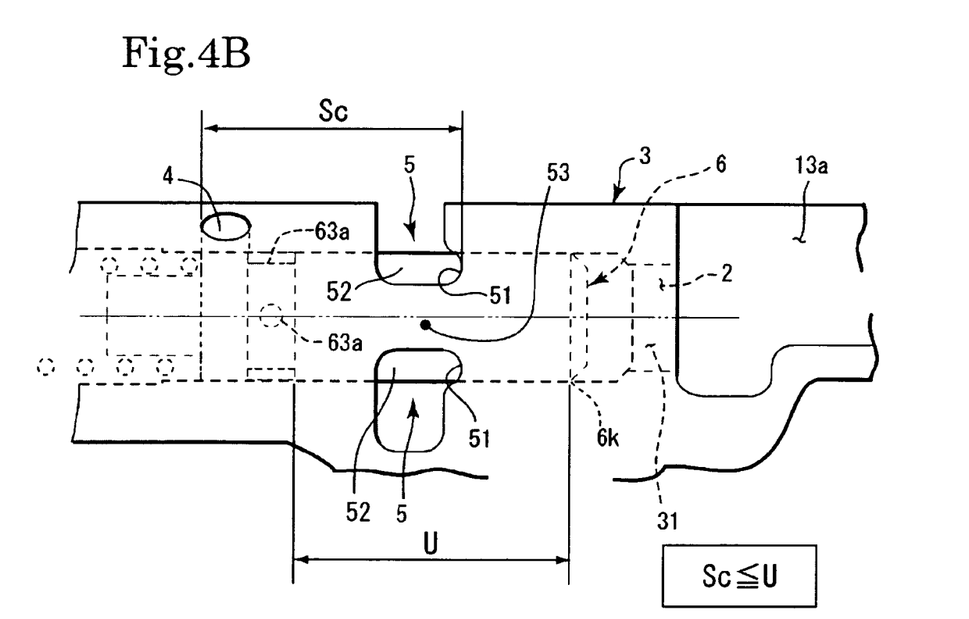
FIG. 4B is a plan view showing a substantial part of FIG. 4A.

As shown in FIG. 1, in substantially an intermediate position in the axial direction of the valve housing 3, a first discharge part 4 and second discharge part 5 are formed in different positions in the axial direction. The substantially intermediate position of the valve passage 31 includes the entire range except for the part near both ends of a passage direction. The first discharge part 4 and the second discharge part 5 are the sections for establishing a communication between the inside and the outside of the valve passage 31, wherein the second discharge part 5 is positioned nearer to the relief flow-in part 2 than the first discharge part 4, that is, in the position near the relief flow-in closing surface 33 (see FIG. 4).

The first discharge part 4 is formed as a small-diameter through-hole for forming a communication between the inside and the outside of the valve passage 31 of the valve housing 3. The diameter of the hole of the first discharge part 4 is equal to (or substantially equal to) the groove width of an outer circumferential side part opening 63a of the relief valve 6, which will be described hereinafter. Furthermore, the first discharge part 4 is formed along a direction diagonal to the valve housing 3 (see FIG. 3A). The second discharge part 5 is formed in a position near the relief flow-in part 2 in the passage direction of the valve passage 31 (see FIG. 1A, FIG. 2B, FIG. 3C and FIG. 4). The second discharge part 5 is configured by a small opening part 51 and large opening part 52, wherein the small opening part 51 is formed nearer to the relief flow-in part 2 than the large opening part 52 (see FIG. 4).

Two of the second discharge parts 5 are formed substantially symmetrically in a direction perpendicular to the axial direction of the valve housing 3, that is, in a width direction, with an appropriate space therebetween (see FIG. 4B). A remaining wall part 53 formed integrally with the valve passage 31 is provided between the second discharge parts 5, 5, wherein the remaining wall part 53 continues to a part of the valve passage 31 and functions as a guide holding part of a moving operation of the relief valve 6 in the section of the second discharge part 5.

Also, from the perspective of intensity, the small opening part 51 is preferably formed along the remaining wall part 53 so that the rigidity of the valve housing 3 can be maintained in the second discharge part 5. In addition, the remaining wall part 53 functions as a guide when the relief valve 6 passes through the second discharge part 5. In other words, when the relief valve 6 moves from the small opening part 51 of the second discharge part 5 to the large opening part 52 and thereby the relief oil is discharged, the relief valve 6 within the valve housing 3 is apt to incline (fall over) toward the large opening part 52 due to the flow and pressure of the oil.

However, because the remaining wall part 53 also functions as a guide for securely preventing the relief valve 6 from abutting on the remaining wall part 53 and fall over when moving from the small opening part 51 to the large opening part 52, calling between the relief valve 6 and the large opening part 52 can be securely prevented even when the large opening part 52 is formed relatively large. The large opening part 52 is formed as a substantially rectangular opening section. Further, the small opening part 51 is formed relatively smaller than the large opening part 52 (see FIG. 4B). The large opening part 52 is formed to extend from a top part 32a of the housing 3 toward a bottom part 32b in a width direction both side section of the valve housing (see FIG. 3C).

Figure 3A:
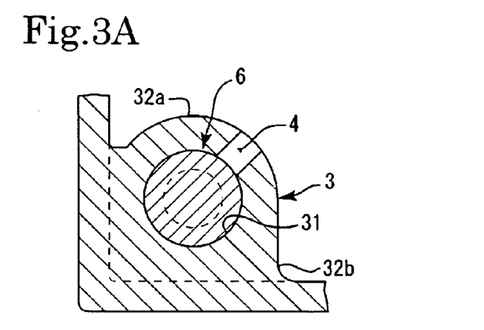
FIG. 3A is a cross-sectional view taken along the arrow Xa-Xa of FIG. 1.
Figure 3B:
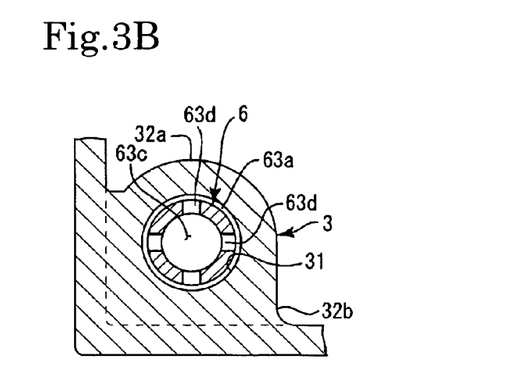
FIG. 3B is a cross-sectional view taken along the arrow Xb-Xb of FIG. 1.
Figures 3C, 3D, 3E:
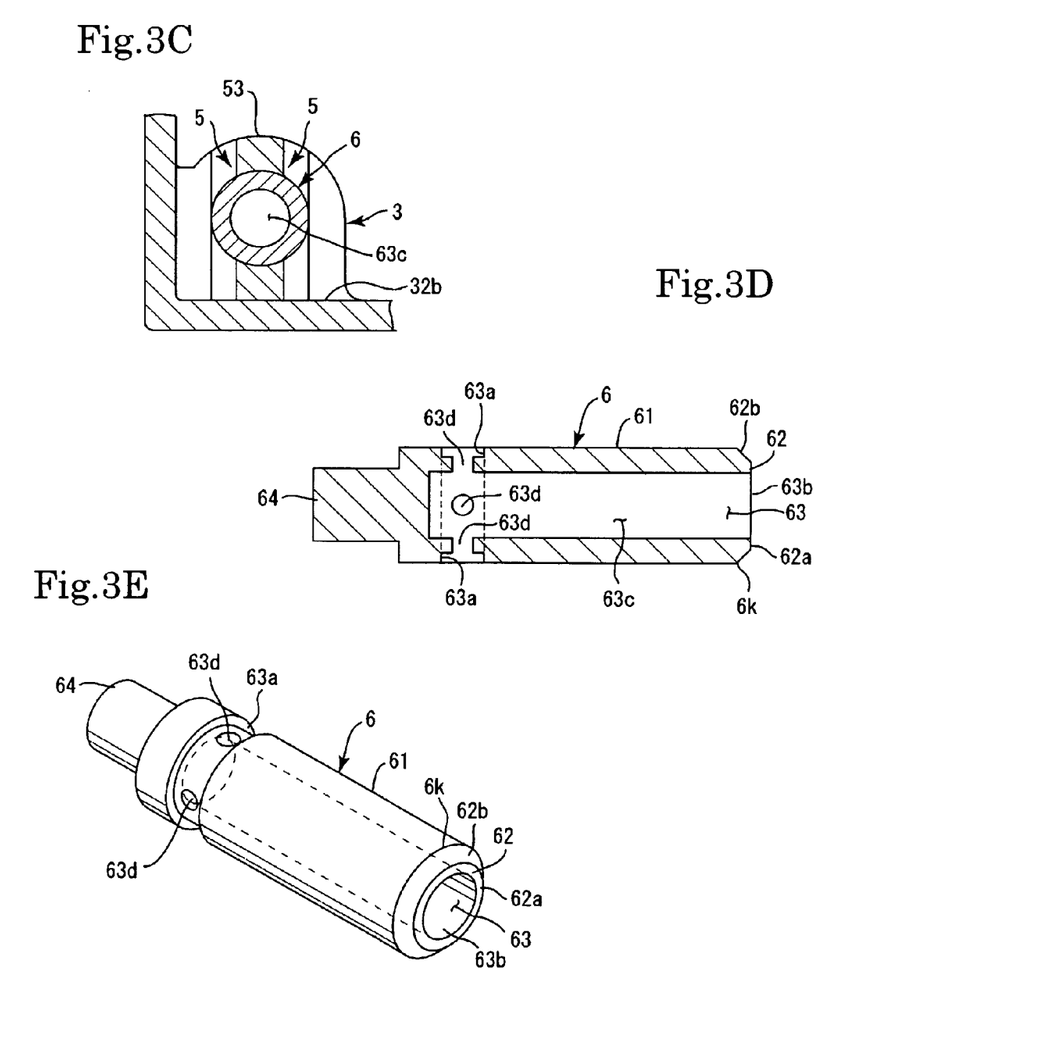
FIG. 3C is a cross-sectional view taken along the arrow Xc-Xc of FIG. 1.
FIG. 3D is a longitudinal sectional side view of the relief valve.
FIG. 3E is a perspective view of the relief valve.

As shown in FIGS. 3D and 3E, the relief valve 6 is configured by an outer circumferential side part 61 and a valve head part 62, wherein the valve head part 62 has an inclined surface part 62b formed on an outer circumferential rim of a head top part 62a. The outer circumferential side part 61 is configured to be in substantially close contact with an inner circumferential surface of the valve passage 31 and to be able to slide smoothly. The relief valve 6 accommodated in the valve housing 3 is constantly biased elastically toward the relief flow-in part 2 of the valve passage 31 by a spring 7 mounted in the valve passage 31, and the valve head part 62 of the relief valve 6 is brought into abutment against the relief flow-in closing surface 33 of the valve passage 31 (see FIGS. 1 and 2). In the axial direction of the relief valve 6, a spring support shaft part 64 is formed on the other side of the valve head part 62, and the spring 7 is supported by the spring support shaft part 64. More specifically, the inclined surface part 62b of the valve head part 62 is brought into abutment against the relief flow-in closing surface 33. Therefore, non-relief operation state is obtained.

By forming the inclined surface part 62b on an outer circumference of the valve head part 62 of the relief valve 6, foreign matters mixed into the oil can be swept away from the second discharge part 5 at once by the inclined surface part 62b. A substantially truncated conical shape is configured by the head top part 62a and the inclined surface part 62b. A valve flow path 63 is formed between the valve head part 62a and the outer circumferential side part 61. In the valve flow path 63, within the relief valve 6, a horizontal flow path 63c is formed to extend from the valve head part 62 along the axial direction, and a vertical flow path 63d perpendicular to the horizontal flow path 63c is formed, with the horizontal flow path 63c in the middle.

The horizontal flow path 63c is communicated with a head part opening 63b formed in the valve head part 62, and the vertical flow path 63d is communicated with the outer circumferential side part opening 63a of the outer circumferential side part 61, whereby the head part opening 63b and the outer circumferential side part opening 63a are communicated with each other. In the outer circumferential side part 61, the outer circumferential side part opening 63a is formed as an outer circumferential groove along the circumferential direction of the outer circumferential side part 61. In other words, a groove passing through an opening hole of the vertical flow path 63d is formed along the circumferential direction of the outer circumferential side part 61. The opening of the vertical flow path 63d is positioned in a groove bottom part of the outer circumferential side part opening 63a formed as the outer circumferential groove (see FIGS. 2C and 3E).

Figure 5A:
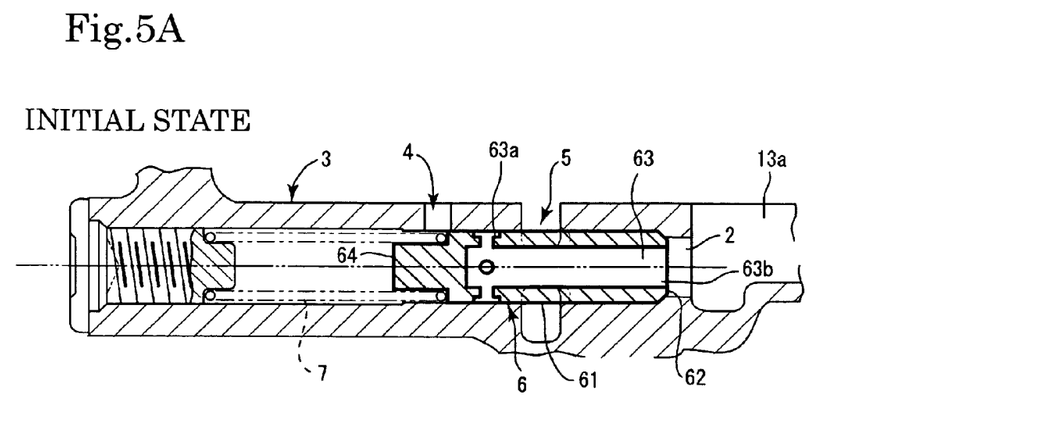
FIG. 5A is an action diagram of an initial stage of a relief operation.
Figure 5B:
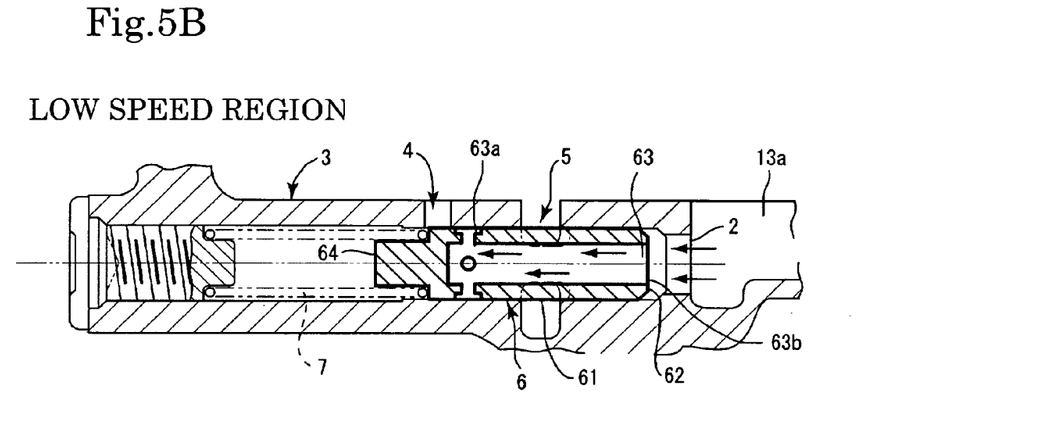
FIG. 5B is an action diagram of a low speed region obtained during the relief operation.
Figure 5C:
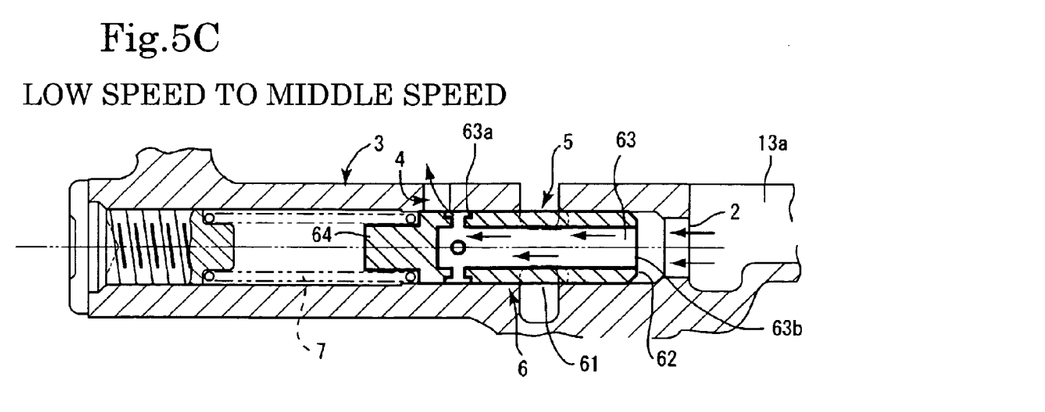
FIG. 5C is an action diagram of low-speed rotation to middle-speed rotation taken place during the relief operation.
Figure 7A:
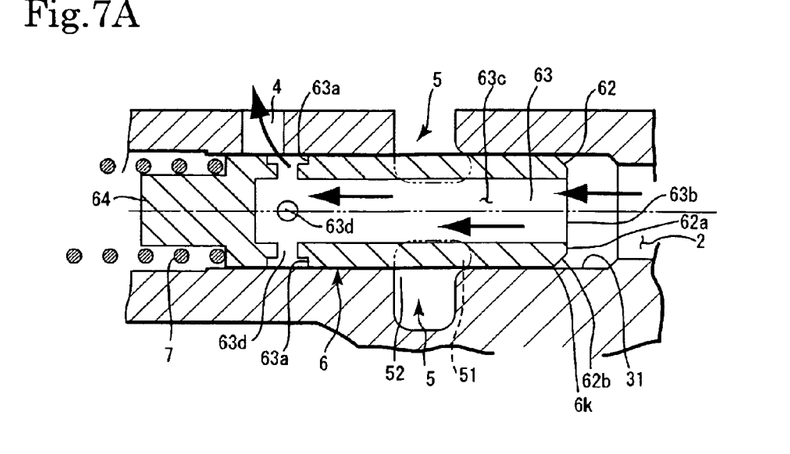
FIG. 7A is an enlarged view showing a state in which an outer circumferential side part opening is communicated with a first discharge part and consequently oil is fed to the first discharge part during a relief valve operation when the longest gap Sc is smaller than a gap U.

The oil that is fed through the horizontal flow path 63c and the vertical flow path 63d flows out to the outer circumferential side part opening 63a formed as the outer circumferential groove, and is fed to the first discharge part 4 when the relief valve 6 slides within the valve passage 31 and the outer circumferential side part opening 63a is communicated with the first discharge part 4 (see FIGS. 5C and 7A). One end of the spring 7 in a longitudinal direction is mounted on the rear part side of the relief valve 6, and the other end is fixed by a holding member 8 mounted in the valve passage 31 (see FIGS. 1B and 1C). In the state in which the outer circumferential side part opening 63a of the relief valve 6 reaches the position of the first discharge part 4 formed in the valve housing 3, the valve flow path 63 and the first discharge part 4 are communicated with each other (see FIGS. 5C and 7A).

The relief valve 6 is configured such that, in its initial state, that is, when the valve head part 62 abuts on the relief flow-in closing surface 33 of the valve passage 31, the shortest gap Sa in the axial direction between the outer circumferential side part opening 63a of the valve flow path 63 and the first discharge part 4 is smaller than the shortest gap Sb in the axial direction between the valve head part 62 and the second discharge part 5 (see FIG. 2). In other words, Sb>Sa is established. Here, the shortest gap Sa between the outer circumferential side part opening 63a and the first discharge part 4 is the shortest gap in the gap between a section that is on an opening rim of the outer circumferential side part opening 63a, which is closest to the first discharge part 4 along the axial direction, and a section that is on an opening rim of the first discharge part 4, which is closest to the outer circumferential side part opening 63a along the axial direction.

Moreover, the shortest gap Sb is the shortest gap in the gap between a section that is on an opening rim of the second discharge part 5, which is closest to the valve head part 62 along the axial direction, and the valve head part 62. In other words, this shortest gap is the gap between the second discharge part 5 and a boundary 6k position between the inclined surface part 62b and the outer circumferential side part 61 (see FIG. 2). As described above, in the initial state of the relief valve 6, the shortest gap Sa between the outer circumferential side part opening 63a of the valve flow path 63 and the first discharge part 4 is made shorter than the shortest gap Sb between the valve head part 62 and the second discharge part 5, whereby first the outer circumferential side part opening 63a and the first discharge part 4 can be communicated with each other as the relief valve 6 slides, and the relief operation can be taken place (see FIG. 7A). Subsequently, the operation of allowing the valve head part 62 to pass through the second discharge part 5 is started, whereby the second discharge part 5 can perform the relief operation (see FIG. 7C).

In addition, when the space between the boundary 6k position between the inclined surface part 62b and the outer circumferential side part 61 and a rim section on the outer circumferential side part opening 63a that is closest to the valve head part 62 is obtained as a gap U, the longest gap Sc between the first discharge part 4 and the second discharge part 5 is made shorter than the gap U (see FIG. 4). Alternatively, the longest gap Sc can be made equal to the gap U. In other words, Sc≦U can be established. Here, the longest gap Sc is the gap between a section that is an opening rim of the first discharge part 4, which is farthest from the second discharge part 5 along the axial direction, and a section that is on an opening rim of the second discharge part 5, which is farthest from the first discharge part 4 along the axial direction. In other words, this gap is the gap between the sections that are farthest from (or have the longest distance between) the first discharge part 4 and the second discharge part 5 (see FIG. 4B).

By adding the condition where the longest distance Sc the gap U is established to the condition where the shortest gap Sb>the shortest gap Sa is established, first the outer circumferential side part opening 63a is communicated with the first discharge part 4 as the relief valve 6 slides within the valve passage 31 from the initial state (where the first discharge part 4 and the second discharge part 5 are closed), whereby the relief operation can be carried out in the first discharge part 4 (see FIG. 7A).

Figure 7B:
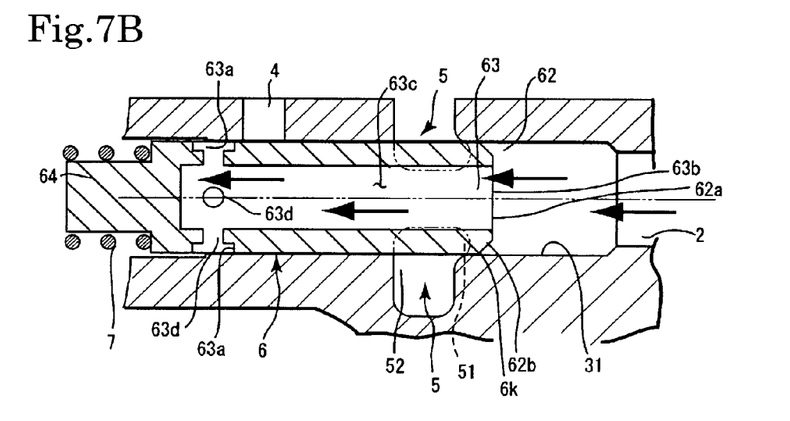
FIG. 7B is an enlarged view showing a state in which the first discharge part and a second discharge part are both closed during the relief operation.
Figure 7C:
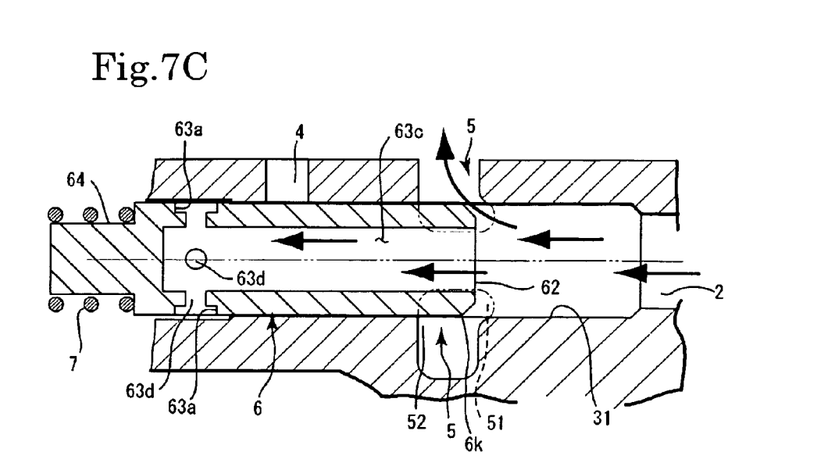
FIG. 7C is an enlarged view showing a state in which an operation of allowing a valve head part to pass through the second discharge part is started so that the second discharge part can carry out the relief operation.

Next, when the relief valve 6 continues sliding, both the first discharge part 4 and the second discharge part 5 enter the closed state (see FIG. 7B). When the relief valve 6 further continues sliding, the valve head part 62 passes through the second discharge part 5, and the inside and the outside of the valve passage 31 are communicated with each other via the second discharge part 5 (see FIG. 7C), whereby the relief operation can be started. Under the conditions previously described, the first discharge part 4 and the second discharge part 5 cannot perform the relief operation at the same time.

Figure 9A:
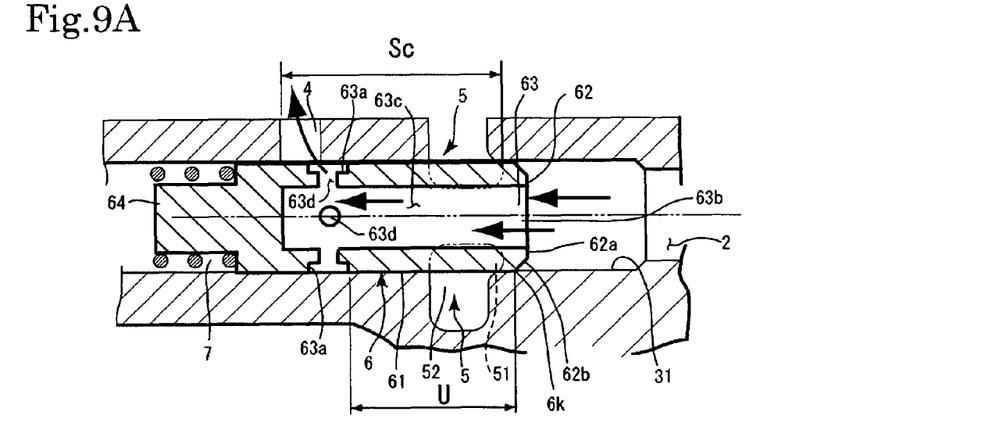
FIG. 9A is an enlarged view showing a state in which the outer circumferential side part opening is communicated with the first discharge part and consequently the oil is fed to the first discharge part during the relief valve operation when the longest gap Sc is larger than the gap U.
Figure 9B:
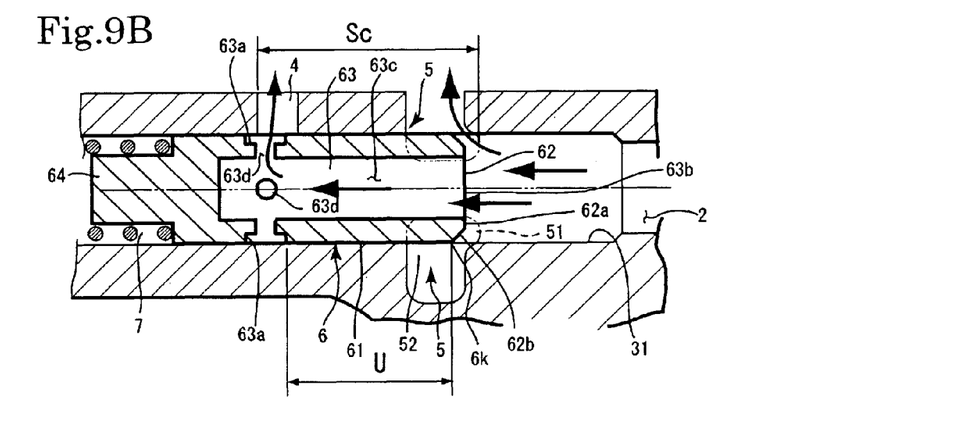
FIG. 9B is an enlarged view showing a state in which both the first discharge part and the second discharge part can carry out the relief operation during the relief operation.
Figure 9C:
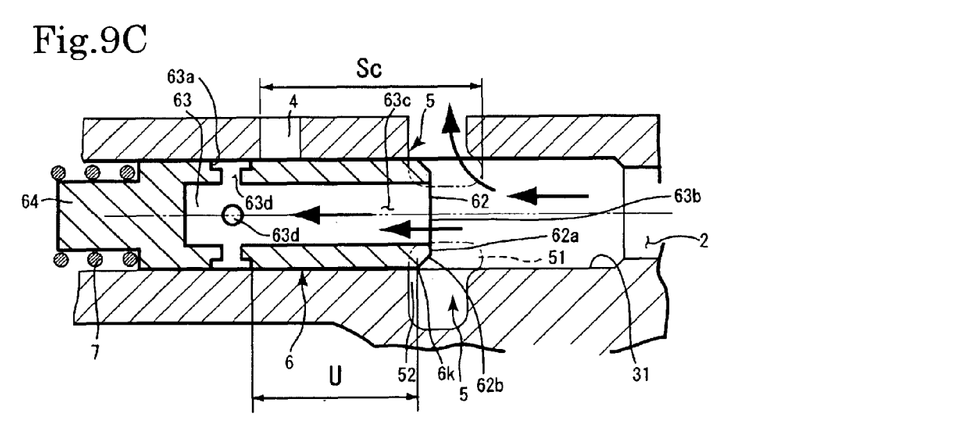
FIG. 9C is an enlarged view showing a state in which the first discharge part is closed and only the second discharge part can carry out the relief operation.

In addition, sometimes the longest gap Sc between the first discharge part 4 and the second discharge part 5 is made larger than the gap U between the boundary 6k position between the inclined surface part 62b and the outer circumferential side part 61 and the rim section on the outer circumferential side part opening 63a closest to the valve head part 62. In other words, Sc>U is established. In this case, first the outer circumferential side part opening 63a is communicated with the first discharge part 4 as the relief valve 6 slides within the valve passage 31 from the initial state (where the first discharge part 4 and the second discharge part 5 are closed), whereby the relief operation can be carried out in the first discharge part 4 (see FIG. 9A). When the relief valve 6 further continues sliding, the relief operation is started in the second discharge part 5 while the relief operation is being performed by the first discharge part 4 (see FIG. 9B). In other words, the relief operation of the first discharge part 4 is carried out previously, but thereafter the relief operation can be performed by the first discharge part 4 and the second discharge part 5 at the same time. When the relief valve 6 further continues sliding, the first discharge part 4 enters the closed state, and the relief operation is performed only by the second discharge part 5 (see FIG. 9C).

In its initial state, that is, when the valve head part 62 abuts on the relief flow-in closing surface 33 of the valve passage 31, the shortest gap Sa in the axial direction between the outer circumferential side part opening 63a of the valve flow path 63 and the first discharge part 4 is sometimes equal to the shortest gap Sb in the axial direction between the valve head part 62 and the second discharge part 5. In other words, Sb=Sa is established. Moreover, the longest gap Sc between the first discharge part 4 and the second discharge part 5 is sometimes equal to the gap U between the boundary 6k position between the inclined surface part 62b and the outer circumferential side part 61 and the rim section on the outer circumferential side part opening 63a closest to the valve head part 62. In other words, Sc=U is established. Therefore, when the shortest gap Sa is equal to the shortest gap Sb and the longest gap Sc is equal to the gap U, the relief operation of the first discharge part 4 and the relief operation of the second discharge part 5 are started simultaneously by communicating the outer circumferential side part opening 63a and the first discharge part 4 with each other and allowing the valve head part 62 to pass through the second discharge part 5.

The relief operation according to the present invention will be described next. The oil pump according to the present invention is activated by receiving rotation of the engine that is not shown). When the relief operation is not necessary during engine shutdown or low-speed rotation, the valve head part 62 of the relief valve 6 is brought into abutment against the relief flow-in closing surface 33 (initial state) (see FIG. 5A). Moreover, the outer circumferential side part opening 63*a* of the relief valve 6 is positioned between the second discharge part 5 and the first discharge part 4 along the axial direction, from the relief flow-in closing surface 33. In addition, the first discharge part 4 and the second discharge part 5 are closed by the relief valve 6.

Figure 6A:
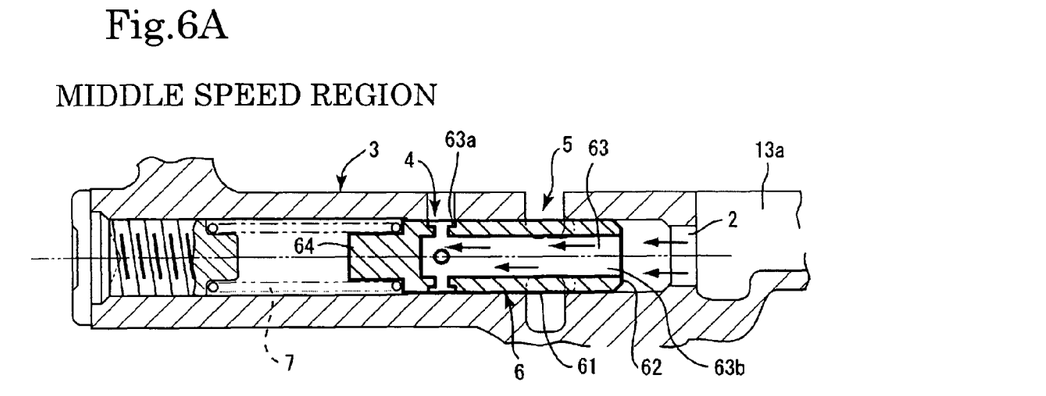
FIG. 6A is an action diagram of a middle speed region obtained during the relief operation.

When the engine is started, the oil pressure in the low speed region is such that, although the relief valve 6 slides slightly, the relief operation does not take place because the first discharge part 4 and the second discharge part 5 are closed (see FIG. 5B). In the transition region between the low speed region and the middle speed region of the engine, the pressure of the oil discharged from the discharge port 13 rises, and the oil pressurizes the valve head part 62 to allow the relief valve 6 to start sliding. By allowing the relief valve 6 to slide, the outer circumferential side part opening 63*a* reaches the position of the first discharge part 4, whereby the outer circumferential side part opening 63*a* and the first discharge part 4 are communicated with each other. The oil is relieved for the first time from the valve flow path 63 of the relief valve 6 via the outer circumferential side part opening 63*a* and the first discharge part 4 (see FIG. 5C). When the outer circumferential side part opening 63*a* and the first discharge part 4 are communicated with each other, the second discharge part 5 is still in the closed state. Therefore, the increasing rate of the discharge pressure becomes moderate, and therefore the discharge pressure does not increase dramatically. In the middle speed region of the engine, the position of the first discharge part 4 completely matches the position of the outer circumferential side part opening 63*a* (see FIG. 6A).

Figure 6B:
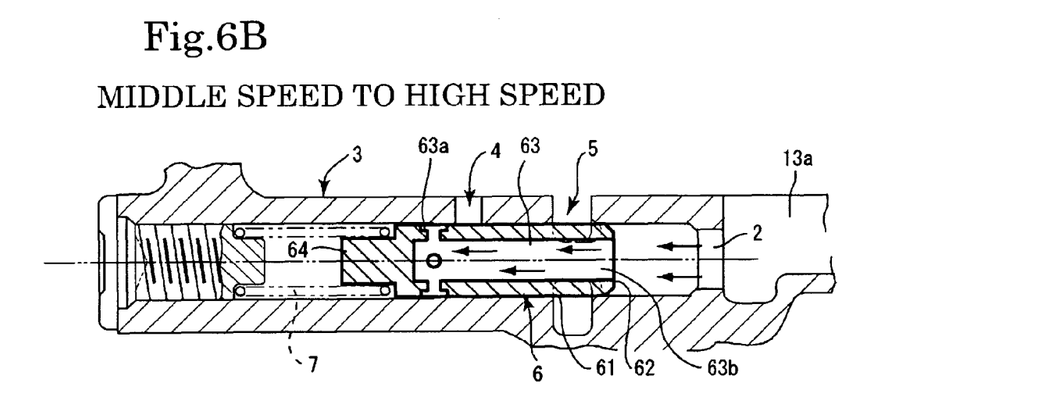
FIG. 6B is an action diagram of middle-speed rotation to high-speed rotation taken place during the relief operation.

Next, in the transition region between the middle speed region of the engine and the high speed region, the relief valve 6 further slides, and the outer circumferential side part opening 63*a* is separated from the first discharge part 4. In other words, the communication between the outer circumferential side part opening 63*a* and the first discharge part 4 is released, and the first discharge part 4 is closed, meaning that the relief operation by the first discharge part 4 is stopped (see FIG. 6B). Moreover, in this region the second discharge part 5 is in the closed state. Therefore, in the middle speed region, the oil is not relieved at all. As a result, the increasing rate of the discharge pressure increases, whereby the discharge pressure rises. The graph in FIG. 8 shows the increase of the oil pressure in the transition region having the abovementioned rotation speed.

Figure 6C:
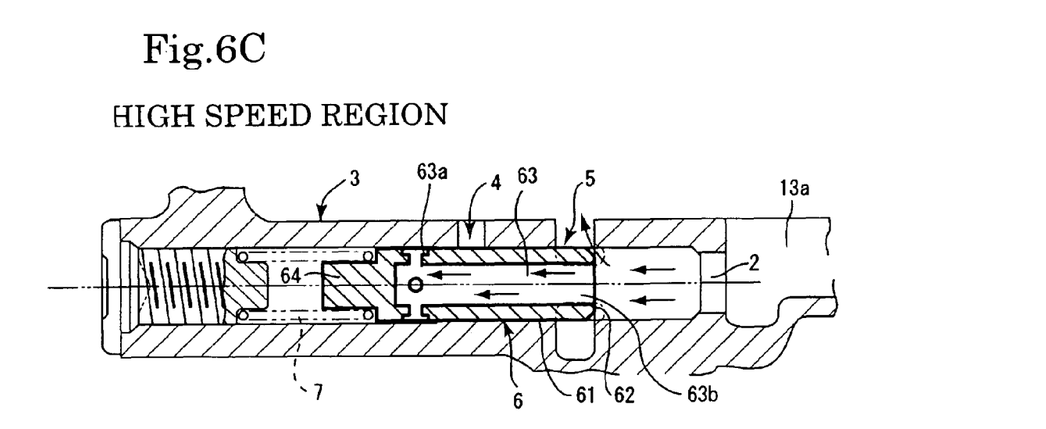
FIG. 6C is an action diagram of a high speed region obtained during the relief operation.

Subsequently, in the high speed region of the engine, the relief valve 6 further slides, and the valve head part 62 reaches the second discharge part 5, whereby the second relief operation takes place (see FIG. 6C). At this moment, the first discharge part 4 is closed. The second relief operation is carried out between the valve head part 62 and the second discharge part 5 configured by the small opening part 51 and the large opening part 52 as described above. The amount of oil returned by the relief operation increases, the increasing rate of the discharge pressure becomes moderate, and the discharge pressure is gently increased by the increase in the engine rotation speed.

When the position of the valve head part 62 starts passing through the small opening part 51 of the second discharge part 5, the oil is gradually relieved from the small opening part 51. At this moment, the amount of oil relieved from the small opening part 51 is very small. Moreover, when the relief valve 6 is pressurized by a high pressure, the relief valve 6 moves, and the valve head part 62 reaches the large opening part 52, increasing the amount of oil relieved. In this manner, the amount of oil relieved increases from the small opening part 51 to the large opening part 52.

Figure 8:
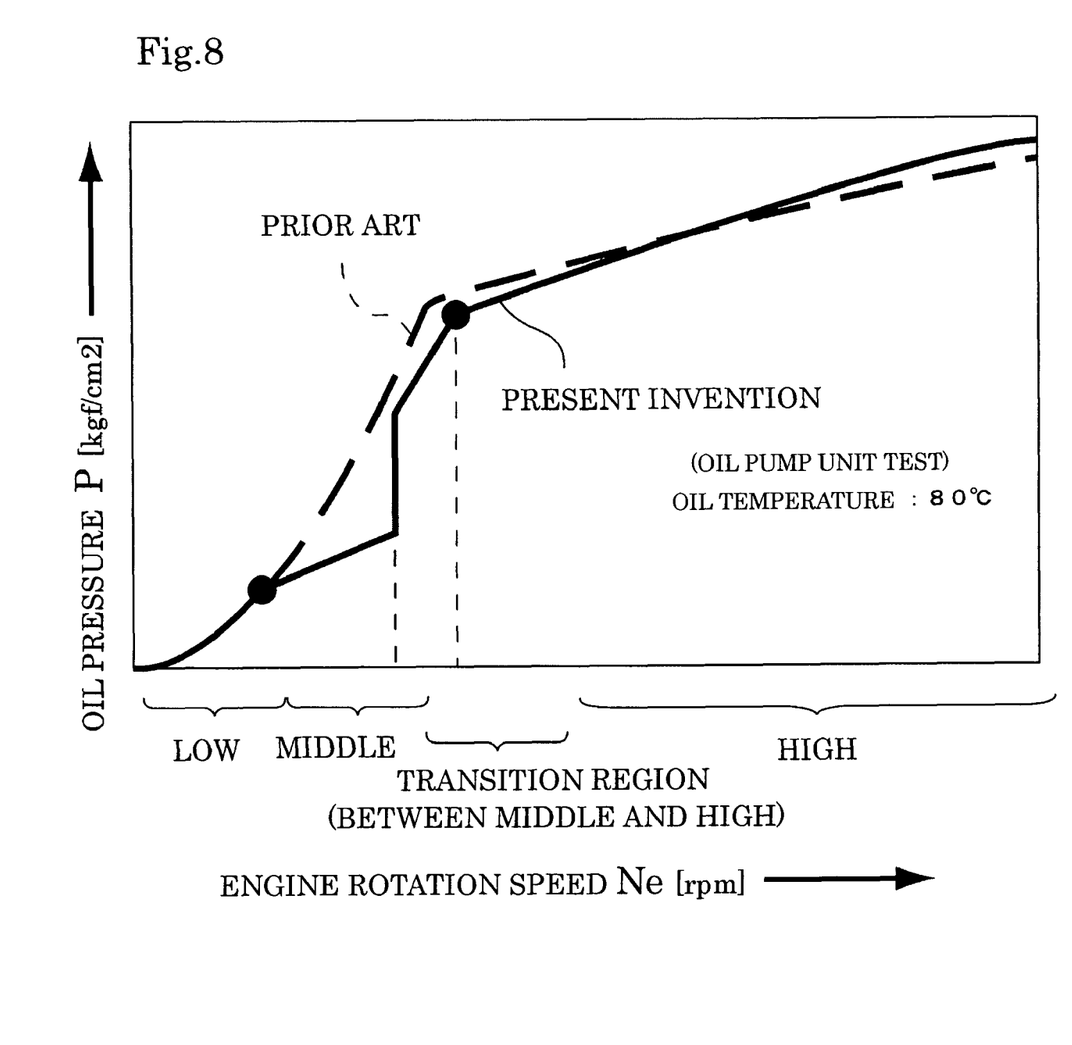
FIG. 8 is a graph showing the characteristics of the present invention.

The graph in FIG. 8 shows that the increase of the oil pressure changes gently and that the increasing rate drops in the relief operation between the low-speed rotation and the middle-speed rotation of the engine. Moreover, in the transition region between the middle speed region and the high speed region, the relief operation is not performed by the first discharge part 4 or the second discharge part 5, and therefore the increasing rate of the oil pressure is high. Particularly, the graph shows that oil discharge pressure increases in the transition region where the discharge pressure and discharge amount need to be increased, and therefore that a significant oil flow rate can be ensured.

What is claimed is:

1. A relief valve structure, comprising:
    a relief valve having formed therein a valve flow path for communicating between a valve head part and an outer circumferential side part;
    a valve housing in which a valve passage accommodating the relief valve is formed;
    a relief flow-in part formed on an axial direction at one end side of the valve passage and communicating with the valve passage;
    a first discharge part formed in the valve housing and communicating with the valve flow path by the movement of a relief valve; and
    a second discharge part that is opened by allowing the valve head part to pass therethrough,
    wherein the second discharge part is positioned nearer to the relief flow-in part than the first discharge part, and a shortest gap between an outer circumferential side part opening of the valve flow path and the first discharge part is the same as or shorter than a shortest gap between the valve head part and the second discharge part during an initial state of the relief valve,
    wherein a longest gap between the first discharge part and the second discharge part is the same as or shorter than a gap between a boundary position between an inclined surface part of the relief valve and the outer circumferential side part, and a section closest to the valve head part of the outer circumferential side part opening.

2. The relief valve structure according to claim 1, wherein the outer circumferential side part opening of the valve flow path is formed as an outer circumferential groove formed along a circumferential direction of the outer circumferential side part.

3. A relief valve structure, comprising:
    a relief valve having formed therein a valve flow path for communicating between a valve head part and an outer circumferential side part;
    a valve housing in which a valve passage accommodating the relief valve is formed;
    a relief flow-in part formed on an axial direction at one end side of the valve passage and communicating with the valve passage;
    a first discharge part formed in the valve housing and communicating with the valve flow path by the movement of a relief valve; and a second discharge part that is opened by allowing the valve head part to pass therethrough, wherein, at a time of relief operation, the valve flow path and the first discharge part are communicated with each other prior to a start of an operation for allowing the valve head part to pass through the second discharge part, the communication only is established during a middle-speed rotation of an engine, an operation for allowing the valve head part to pass through the second discharge part is started during a high-speed rotation of the engine, and a transition region where a rotation speed of the engine transits from the middle speed rotation to the high speed rotation has a rotation speed region where a relief does not take place.

* * * * *